United States Patent

Weinmann

[15] 3,698,582
[45] Oct. 17, 1972

[54] ARTICULATED VEHICLES

[72] Inventor: Karl Weinmann, Stuttgart, Germany

[73] Assignee: KAMAG Transporttechnik GmbH & Co.

[22] Filed: April 17, 1970

[21] Appl. No.: 29,612

[30] Foreign Application Priority Data

April 26, 1969 Germany..........P 19 21 477.8

[52] U.S. Cl..............................214/506, 280/425 A
[51] Int. Cl. ..............................................B62d 53/06
[58] Field of Search ........280/423 B, 425 A; 214/506

[56] References Cited

UNITED STATES PATENTS

| 2,944,834 | 7/1960 | Hill | 280/425 A |
| 2,968,412 | 1/1961 | Hill | 280/423 B X |
| 3,215,449 | 11/1965 | Talbert | 280/425 A |

FOREIGN PATENTS OR APPLICATIONS

| 620,378 | 3/1949 | Great Britain | 280/425 A |

*Primary Examiner*—Leo Friaglia
*Attorney*—McDougall, Hersh & Scott

[57] ABSTRACT

A rear-wheeled load-carrying frame of a low-bed type trailer is connectible to a saddle tractor by a support frame. The support frame has a horizontal arm adapted to rest on the saddle of the tractor and a normally vertical beam hinged to the rear end of the horizontal arm. The lower end of the beam has at least one hook shaped claw adapted to engage behind a corresponding coupling pin on the forward end of the load-carrying frame and engages a stop face on said forward end when the beam is in its normal vertical position. A hydraulic jack is provided between the arm and the beam.

Preferably a steering mechanism for a rear bogie on the load-carrying frame includes a vertical steering shaft journalled in the beam and having a coupling arm automatically engageable with a coupling piece connected by a steering linkage to the bogie.

10 Claims, 7 Drawing Figures

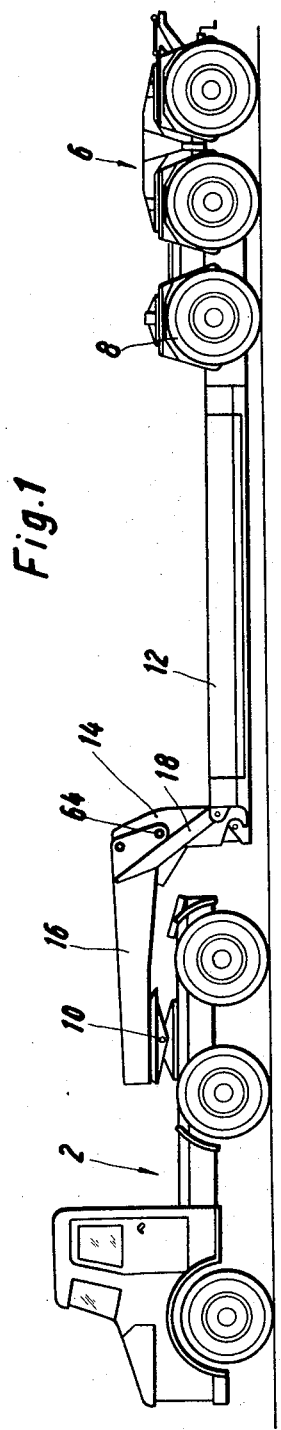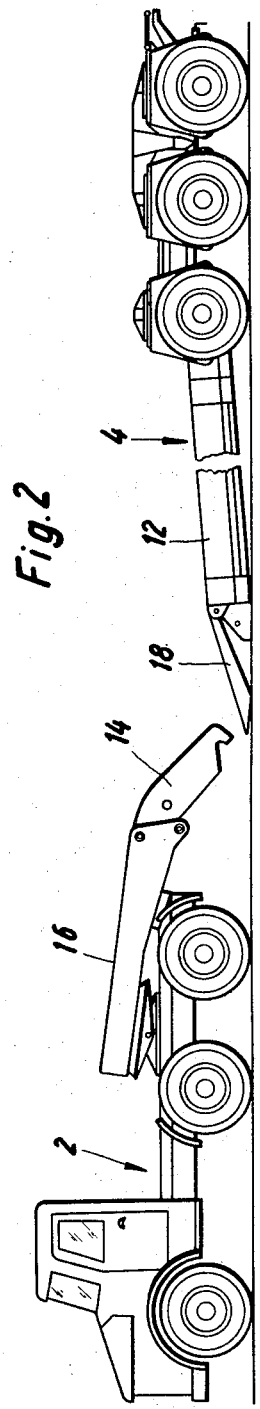

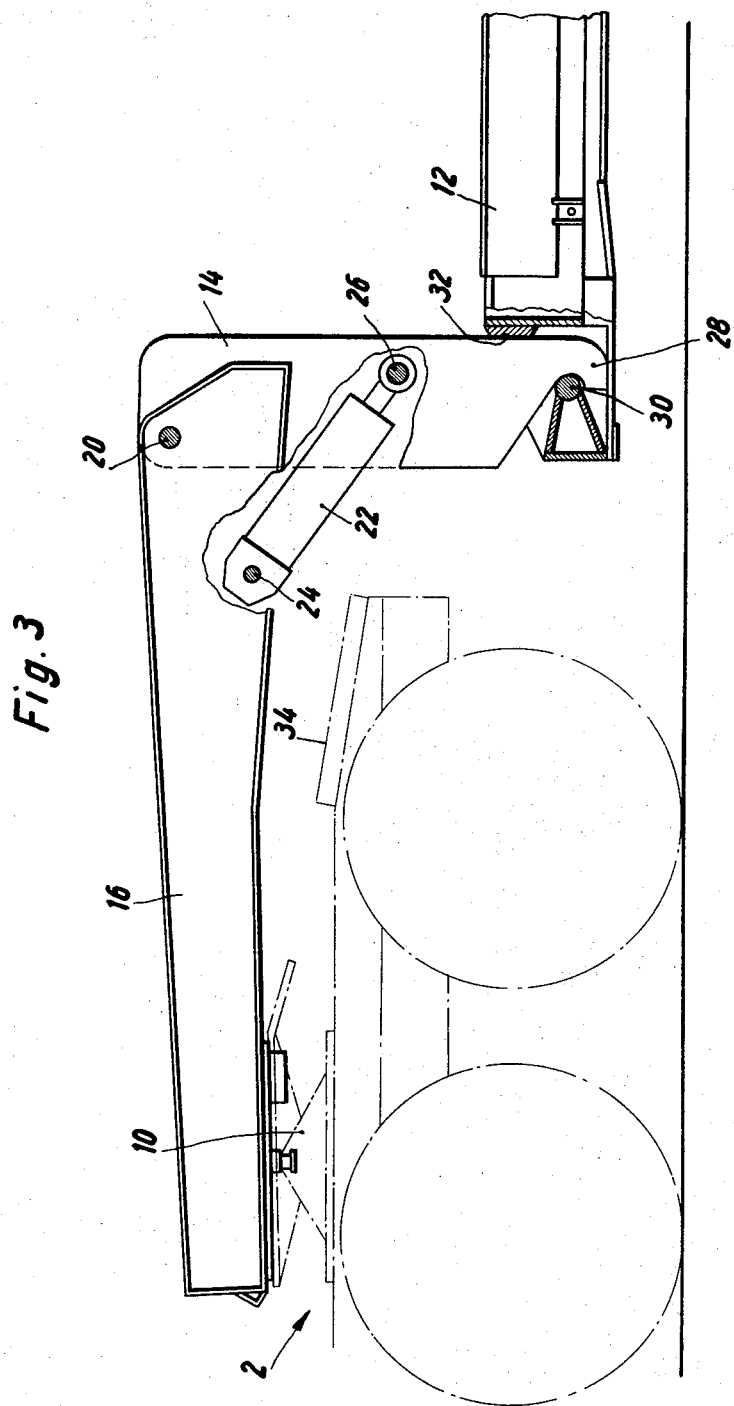

Inventor:

ARTICULATED VEHICLES

The present invention relates to articulated vehicles and more particularly to a device for connecting a load-carrying frame (low loader or the like), provided with rear wheels only, to a saddle tractor, comprising a support frame which rests by a substantially horizontal arm on the saddle of the tractor, the rear end of which arm is provided with a substantially vertical beam which is connectible to the front end of the load-carrying frame.

Load-carrying frames, such as low loaders or so-called bogie trailers, transported by saddle tractors usually have rigid support frames, so-called swan necks, secured to their front ends for the purpose of supporting the loadcarrying frame on the saddle of the tractor. However, there are many disadvantages in rigidly mounting the support frame on the load-carrying frame. Thus, the load-carrying frame together with the swan neck secured thereto requires a considerable support surface, is expensive to manufacture, and renders it impossible to drive vehicles to be loaded, such as contractors vehicles or the like, on to the load-carrying frame from the front end. A low loader construction is known which overcomes the last-mentioned disadvantage. In this low loader, the swan neck is formed by a vertical beam which is mounted on the front end of the load platform and a horizontal arm mounted on the top end of the beam. In this case, however, the arm is hinged to the beam and the latter is hinged to the load platform, so that the swan neck can be fully extended forwardly after the low loader has been unsaddled. The extending movement is carried out by an hydraulic cylinder which acts upon the arm and upon the beam. When in the extended state, the arm and the beam serve as a flat drive-on ramp for the load platform. Thus, a vehicle to be loaded can drive on to the load platform of the low loader from the front. However, the known construction has the disadvantages that the extendible swan neck is relatively complicated and expensive, the low loader equipped in such a manner requires a considerable parking space, and the swan neck itself is very heavy since it must be constructed as a strong drive-on ramp across the entire width of the load platform.

A device for connecting a load-carrying frame to a saddle tractor is also known in which the support frame remains on the tractor. The support frame comprises a substantially horizontal arm which rests on the saddle of the tractor, and a substantially vertical beam which is provided on the rear end of the arm and which is connected to the front end of the load-carrying frame by means of a coupling device. In this known device, the horizontal arm resting on the saddle is rigidly connected to the vertical beam, and the coupling device comprises a rearwardly projecting arm which is also rigidly secured to the bottom end of the vertical beam and which engages into a longitudinally extending receiving opening at the front end of the load-carrying frame. The saddle of the tractor is raiseable by means of an hydraulic arrangement. When the rear arm has been inserted into the receiving opening on the load-carrying frame, the rigid, Z-shaped support frame is raised by means of the hydraulic lifting device for the tractor saddle. The rearwardly projecting arm is thereby locked in the receiving opening and raises the front end of the load-carrying frame, so that the load-carrying frame can be transported. This known device requires a special tractor having a raiseable saddle. Conventional tractors would have to be converted before this known device could be used. The coupling device is such that it allows a certain lateral movability of the swan neck in the receiving opening. Thus, it is possible to use the known device with bogie trailers moved at slow speeds and with similar load-carrying frames, but not in the case of low loaders which are also moved at high speeds in street traffic and thus require the swan neck to be coupled to the load platform of the low loader in a secure and rigid manner.

A feature of the present invention is to provide a connecting device by which all types of load-carrying frames, i.e., also low loaders intended for road traffic, can be rapidly and reliably coupled to conventional saddle tractors by a single operator. The load-carrying frame is to have no troublesome or complicated swan neck construction when in the unsaddled state, and the swan neck itself is to be readily connectible to conventional saddle tractors, no raiseable saddle being required to raise the load-carrying frame.

In accordance with the present invention, the vertical beam is articulated to the horizontal arm and is pivotable rearwardly by means of a piston/cylinder unit, and the coupling device comprises at least one and preferably at least two hook-shaped claws which are located at the bottom end of the vertical beam and which are open towards the tractor, and a corresponding number of coupling pins of which are engaged from the rear by the claws, and at least one forwardly directed stop face for the beam when the latter is in the vertical position.

The angular adjustability of the beam, articulated to the arm, by means of the piston/cylinder unit simultaneously effects the lowering and the raising of the load-carrying frame and the disengaging and engaging of the hook-shaped claws, arranged on the beam, relatively to the coupling pins on the load-carrying frame. The stop faces which are in contact with the beam when the latter is in the vertical position ensure the immovable connection of the swan neck to the load-carrying frame when the beam is in this position (travelling position).

Preferably a support face for the support frame is provided behind the saddle on the tractor. The horizontal arm of the support frame abuts against this support face when in the swung-out state, thus facilitating the disengaging of the claws from the coupling pins. Thus, the entire coupling operation can be carried out solely by the driver of the tractor. Advantageously, a locking device is provided on the horizontal arm and on the beam, by means of which locking device the beam is lockable relatively to the arm when the beam is in its vertical (not swung out) position. Thus, the hinge, moved by the piston/cylinder unit, between the arm and the beam can be locked in the travelling position, so that the swan neck reliably maintains its position and its rigid coupling connection to the load-carrying frame even if the supply of pressure medium for the piston/cylinder unit fails. Advantageously, the locking device is formed by at least one bolt which is insertable into openings in the beam and in the arm. Such a bolt can readily be inserted and secured in its locking position.

In a further advantageous embodiment of the locking device, at least one latch is arranged on the beam and engages behind a stop on the arm. This latch can be actuated in a simple manner and can be secured in the locking position. It is non-releasably arranged on the beam. The remote control of the latch from the driver's cab can readily be effected by known means (pressure medium cylinder or the like).

Advantageously, the stop face is arranged above the coupling pins and is offset rearwardly relatively to the latter to the extent where the beam when in its vertical (not swung out) position abuts against the stop face when the hook-shaped claws embrace the coupling pins, so that a powerful coupling connection is formed between the bottom end of the beam and the load-carrying frame and is suitable for transmitting great bending moments.

A vertical steering shaft can be journalled in the beam, its bottom end being provided with at least one coupling arm which engages into a coupling piece of steering linkage for the bogie the coupling pins being located at the front end of the load-carrying frame. To improve the manoeuverability of the saddle tractor, the bogie arranged at the rear end of the low loader is frequently constructed so as to be steerable. The steering movement is effected from the saddling point of the low loader by way of a steering linkage, i.e., the angular movements between the tractor and the saddle trailer are transmitted to the steerable bogie by the steering linkage. When such a steerable bogie is provided, the steering linkage also has to be coupled when coupling the swan neck to the low loader. By journalling in the beam a vertical steering shaft provided at its bottom end with a coupling arm which engages into a corresponding coupling piece in the steering linkage, it is possible to couple the steering linkage simultaneously with the coupling operation between the swan neck and the low loader. This eliminates additional operations which would have to be performed by an operator if the steering linkage had to be connected separately.

A particularly light but strong embodiment of the beam can be obtained by making the beam in the form of two parallel bars each terminating in a hook-shaped claw. The coupling pins can be each arranged between two respective vertical cheeks which extend forwardly from a front cross member of the load-carrying frame, whereby the coupling elements on the load-carrying frame are readily accessible during the coupling operation, which causes little interference during the loading operation. The steering linkage can be mounted in a simple and easily accessible manner by arranging between the two vertical pairs of cheeks two horizontal flat beams which are arranged one above the other, a vertical bearing bolt for the linkage being inserted into the said flat beams in such a manner that the lever of the steering linkage carrying the coupling piece extends rearwardly from the bearing bolt. Advantageously, the axis of rotation of the steering shaft arranged in the beam coincides with the axis of rotation of the vertical bearing bolt when in the coupled state so that, in the coupled state, the rotary movement of the steering shaft can be transmitted to the bearing bolt of the steering linkage in a manner free from jamming.

The space between two lateral upwardly pivotable ramps on the load-carrying frame is particularly suitable for arranging the coupling device, since, when arranged in this space, the coupling device does not obstruct a vehicle to be loaded when the latter is being driven on the load-carrying frame.

The invention is further described, by way of example, with reference to the accompanying drawings, in which:

FIG. 1 is a schematic side elevation of a saddle tractor and a low loader having a connecting device constructed in accordance with the present invention, illustrated in the saddled state;

FIG. 2 illustrates the same vehicle in the uncoupled state;

FIG. 3 is an illustration showing details of the connecting device constructed in accordance with the invention, drawn to a larger scale;

Figure 5:
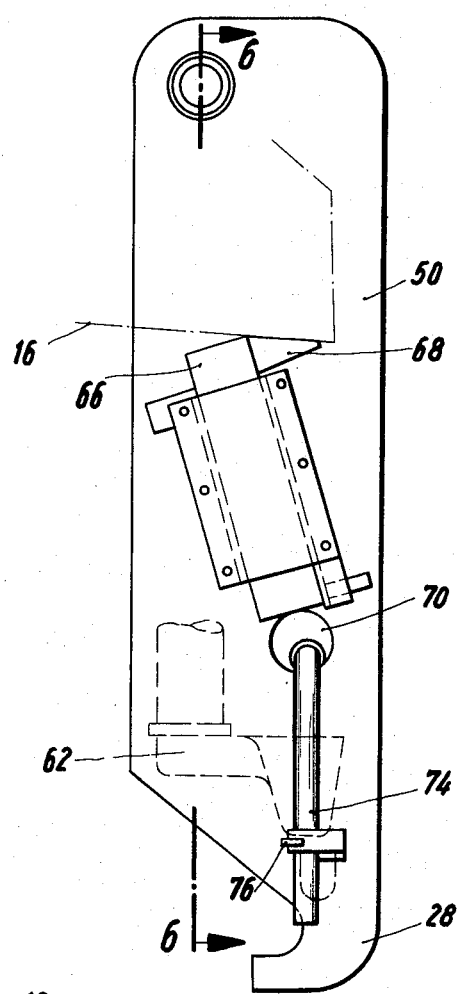
FIG. 5 is a side elevation of details of the vertical beam of the support frame.

FIG. 1 illustrates a three-axle saddle tractor 2 which is connected to a low loader 4. The rear end of the low loader 4 has a bogie 6 which comprises six individually steerable bogies 8. A swan-neck-like support frame is connected to the front end of the load platform 12 of the low loader 4 and comprises a vertical beam 14 and a horizontal arm 16 which rests on the saddle 10 of the tractor 2.

The low loader serves to transport for example contractors vehicles such as road rollers and endless track type tractors. For the purpose of driving these contractors vehicles on and off the low loader, the front end of the latter can be lowered and detached from the beam 14. Upwardly pivotable ramps 18 are arranged on each side of the beam 14 at the front end of the load platform 12 of the low loader 4.

FIG. 2 illustrates the tractor 2 and the low loader 4 in the uncoupled state in which the front end of the load platform 12 is lowered and the ramps 18 are hinged downwardly so that a vehicle to be transported can be driven on to the load platform 12.

As will be seen in greater detail in FIG. 3, the vertical beam 14 is hinged to the horizontal arm 16 by means of a hinge pin 20. An hydraulic piston/cylinder unit 22 is attached to the horizontal arm 16 by means of a pin 24 and to the beam 14 by means of a pin 26 and serves to pivot the beam 14 rearwardly relatively to the horizontal arm 16 about the hinge pin 20. Two hook-shaped claws 28 are located at the bottom end of the vertical beam 14. In the coupled state, the claws 28 engage behind two coupling pins 30 which are arranged at the front end of the load platform 12. Two stop faces 32 for the beam 14 are also located at the front end of the load platform 12 of the low loader 4. When in its vertical, coupled position, the hook-shaped claws 28 of the beam 14 engage behind the coupling pins 30 and at the same time the beam 14 abuts against the stop faces 32, thus preventing the beam from becoming disengaged from the coupling pins 30 when in this position. The front end of the load platform 12 can, in fact, be raised by raising the beam 14. The stop face 32 effectively prevents the claws 28 from being deflected rearwardly.

To uncouple the low loader 4 (after a locking device, to be described later, has been released) oil under pressure is admitted to the piston/cylinder unit 22 by an hydraulic supply and control unit (not illustrated for the sake of simplicity) which is located on the tractor 2 and which may be of a conventional type. The pins 24 and 26 are thereby moved away from each other. Thus, the beam 14 pivots relatively to the arm 16 about the axis of the hinge pin 20. This splaying of the original right angle substantially formed by the arm 16 and the beam 14 results in the first instance in the lowering of the rear end of the arm 16 together with the beam 14 and the lowering of the front end of the load platform 12 until the front end of the load platform 12 rests on the ground. During the further course of the splaying movement of the piston/cylinder unit 22, the tractor 2 is moved forward to a slight extent relatively to the low loader 4 as the angle formed by the arm 16 and the beam 14 is further increased. The underside of the rear end of the arm 16 thereby comes into abutment against a bearing surface 34 on the tractor 2. In the meantime, the beam 14 has been moved away from the stop face 32 on the load platform 12, although the claws 28 still embrace the coupling pins 30. The claws 28 come out of engagement with the coupling pins 30 during a further extending movement effected by the piston/cylinder unit 22, so that the tractor 2 can be moved forwardly away from the low loader 4. The ramps 18 located on the low loader 4 are then swung down forwardly. The tractor 2 and the low loader 4 are illustrated in this state in FIG. 2.

The coupling operation is effected in the reverse manner. When the beam 14 is in the position illustrated in FIG. 2, the tractor 2 reverses towards the loader, on which the loading ramps 18 have already been swung upwardly, until the claws 28 are located above and behind the coupling pins 30. The control device now admits oil under pressure into the piston/cylinder unit 22 so that the two pins 24 and 26 are drawn towards each other. Thus, the angle formed by the arm 16 and the beam 14 is reduced. At the same time the claws 28 engage behind the coupling pins 30 and the tractor is slowly moved nearer to the low loader 4. The front end of the load platform 12 is raised from the ground during the further contraction of the piston/cylinder unit 22 and the arm 16 is raised from the bearing surface 34 on the tractor. These last two operations may take place in the reverse order according to the conditions of levelness of the ground. The hydraulic unit 22 continues to be moved until the arm 16 and the beam 14 have assumed the angular position relatively to each other required for travelling. This also implies that the front end of the load platform 12 has been raised to a sufficient extent. In this position, the arm 16 is locked relatively to the beam 14.

Figure 4:
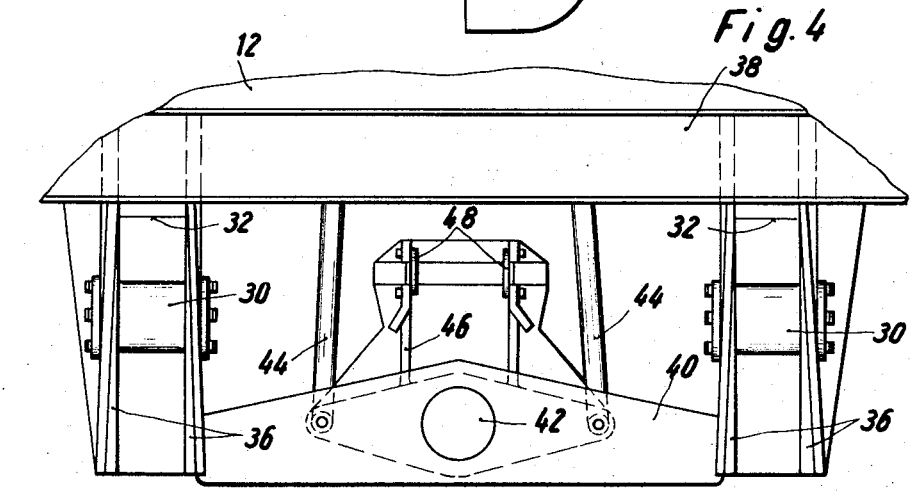
FIG. 4 is a plan view of the front end of the load platform of the low loader.

FIG. 4 is an enlarged plan view of the front end of the load platform 12 showing the part of the coupling device connected thereto. The coupling pins 30 are each arranged between two cheeks 36 which extend forwardly from the front cross member 38 of the load platform 12. Two horizontal flat beams 40 are arranged between the two vertical pairs of cheeks 36, only the top flat beam being seen in FIG. 4. A vertical bearing bolt 42 for the steering linkage of the low loader 4 is inserted between the two horizontal flat beams 40, two push rods 44 of the steering linkage being visible in FIG. 4 together with a steering lever 46 which is connected to the push rods 44 and which is mounted on the bearing bolt 42. The steering lever 46 carries a coupling piece in the form of two vertical plates 48 on an extension which extends rearwardly from the bearing bolt 42. A coupling piece secured to a coupling arm engages between the plates 48 during the coupling operation.

Figure 6:
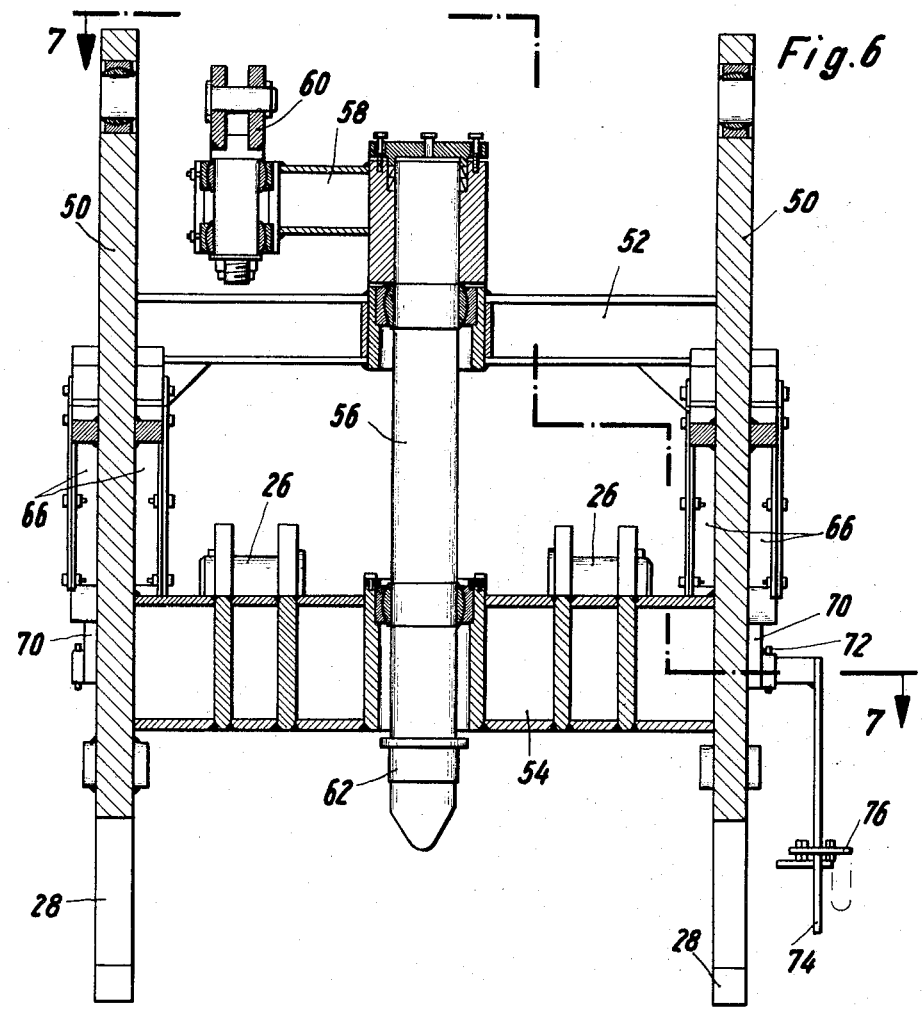
FIG. 6 is a vertical section taken on the line 6—6 in FIG. 5.
Figure 7:
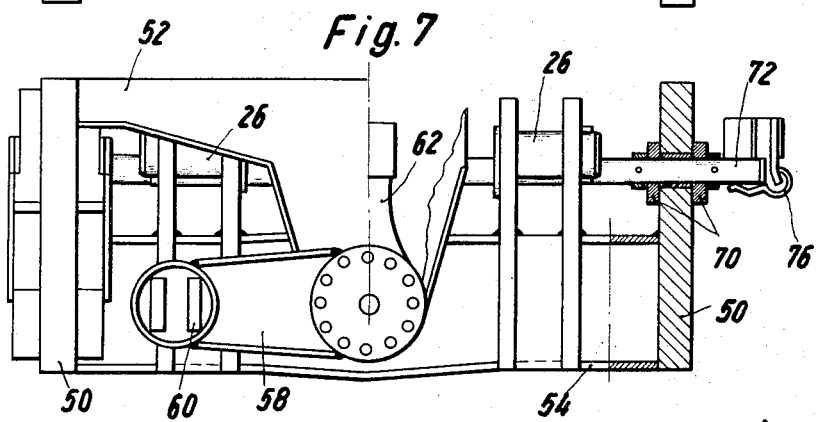
FIG. 7 is a horizontal section taken on the line 7—7 in FIG. 6.

The vertical beam 14 is illustrated as a separate part in FIGS. 5, 6 and 7, drawn to a larger scale. The beam 14 comprises two vertical bars 50 and two box beams 52 and 54 which are arranged horizontally therebetween. A vertical steering shaft 56 is journalled in the two box beams, a lever 58 being mounted at the top end of the steering shaft transversely of the longitudinal direction of the vehicle. The end of the lever 58 carries a clevis joint 60. A steering rod, which is not illustrated in the Figures, extends from the clevis joint 60 to the saddle 10 from where the steering rod transmits the angular movement between the tractor and the support frame of the low loader to the steering shaft 56. A further hinge is provided in the clevis joint 60 to enable the beam 14 also to swing out relatively to the push rod. A rearwardly arranged coupling arm 62 is located at the bottom end of the steering shaft 56. When the beam 14 is being coupled to the load platform 12, the end of the coupling arm 62 engages into the cheeks 48 forming the coupling piece on the steering lever 46. Thus, the steering connection is at the same time established between the saddle of the tractor and the steerable bogie of the low loader.

Two pins 26 for securing respective piston/cylinder units 22 are provided on the beam 14 illustrated in FIGS. 5, 6 and 7, since, in the illustrated embodiment, two identical piston/cylinder units 22, located adjacent each other, are used for swinging out the beam 14. A bolt 64 shown in FIG. 1 is inserted through openings in the arm 16 in the beam 14 for the purpose of locking the beam 14 relatively to he arm 16 when the beam is not in its swung-out position. A further possibility for locking the arm 16 relatively to the beam 14 is illustrated in FIGS. 5, 6 and 7. A latch 66 is guided on each side of the bars 50 and engages behind a stop lug 68 on the arm 16. The two latches 66 of each cheek 50 are moved by means of eccentric discs 70 arranged on a common shaft. The shaft 72 for turning the eccentric discs 70 carries at one end an arm 74 which is fixed in the locking position by a clamping spring 76.

When the beam 14 is in its coupled position, the axis of rotation of the steering shaft 56 coincides with the axis of rotation of the vertical bearing bolt 42. The bottom of each lateral bar 50 of the beam 14 terminates in a respective hook-shaped claw 28.

It is possible for the hook-shaped claws to be provided on the forward end of the load-carrying frame and to face rearwardly and for the coupling pins to be provided on the lower end of the vertical beam.

In cases wherein requirements for lateral stability of the coupling between the tractor and the low loader are not so demanding, e.g. for purely internal transport systems, the two spaced claws can be replaced by a single centrally arranged claw which is engageable behind a single coupling pin.

I claim:

1. Mechanism for releasably connecting a load-carrying frame onto a tractor in which the load-carrying frame is supported at its rearward end portion on wheels rotatably mounted on an axle about which the forward end portion of the frame rocks between raised and lowered positions and in which the tractor has a saddle, a support frame comprising a horizontally disposed arm adapted to be connected at its forward end portion onto the saddle for rocking movement between raised and lowered positions and a bearing surface on the tractor, spaced rearwardly from the saddle, on which the arm rests when in lowered position and which is free thereof when in raised position, and a vertically disposed beam pivotally connected at its upper end portion to the rearward end portion of the arm for relative angular movement about a horizontal axis and for movement with the arm between raised and lowered positions, a stop face on the forward end portion of the load-carrying frame in position to abut the rearward wall of the beam when in raised position and coupling means for detachably coupling a lower end portion of said beam to said forward end portion of the frame comprising a coupling pin and claw one of which is at the lower end portion of the beam and the other of which is at the forward end portion of the load-carrying frame at a level below the stop face and adapted to be in position for relative movement into and out of engagement when the beam and frame are in their lowered positions and interconnected when in raised position with the beam in position to be engaged by said stop face to prevent disengagement when in the raised position.

2. A mechanism as claimed in claim 1, which includes piston and cylinder means for pivoting the beam relative to the arm.

3. A mechanism according to claim 1, further comprising locking means operable between said horizontal arm and said beam for locking said beam relatively to said arm when the beam is in its generally vertical position.

4. A mechanism according to claim 3, in which said locking means comprise openings in said beam and in said arm and at least one bolt insertable through said openings.

5. A mechanism according to claim 3, in which said locking means comprise at least one latch which is arranged on one of said beam and said arm and a stop arranged on the other of said beam and said arm, said latch being cooperable with said stop.

6. A mechanism according to claim 1, in which said coupling pins are disposed on said forward end portion of said load-carrying frame and said hook-like claws are disposed on said portion of said beam and open forwardly.

7. A mechanism according to claim 6 in which said stop face means are arranged above said coupling pins and are staggered rearwardly relatively to the latter to an extent such that said beam, when in its generally vertical position abuts against said stop face means with said hook-shaped claws engaged about said coupling pins.

8. A mechanism according to claim 6 in which said beam includes two parallel bars each terminating in a respective one of said hook-shaped claws.

9. A mechanism according to claim 6 in which said forward end portion of said load-carrying frame comprises a transverse front member and pairs of vertical cheeks extending forwardly from said transverse front member, said coupling pins extending between the cheeks of respective pairs.

10. A mechanism according to claim 1, further comprising two upwardly pivotable loading ramps laterally disposed on said forward end portion of said load-carrying frame said coupling means being disposed between said ramps.

* * * * *